Patented May 26, 1931

1,807,082

UNITED STATES PATENT OFFICE

ALEXANDER BOYNTON, OF SAN ANTONIO, TEXAS

METHOD OF DRILLING WELLS

No Drawing.     Application filed October 19, 1926.   Serial No. 142,781.

This invention relates to a method and product employed in drilling wells and more particularly to a means to limit and localize the penetration of the mud bearing fluid or slush into producing strata.

During the rotary drilling of a well mud fluid or slush is supplied to the bottom of the hole to pick up the cuttings and convey the same to the surface either interiorly or exteriorly of the drill pipe. Obviously, a very powerful pressure is necessary to accomplish this, as the hole being drilled is only slightly greater in diameter than the diameter of the drill pipe, especially at the joints of the drill pipe. When an oil, gas or water bearing stratum is encountered possibly two or three thousand feet below the surface, the strong pressure behind the mud fluid or rotary slush ordinarily forces it a considerable distance into the producing sand with the result that the bailing of the well preparatory to production is greatly prolonged. Furthermore the operator has no assurance that upon the completion of the well no mud will remain in the producing sands. In fact, it is the general belief that enough mud fluid remains in the producing horizons to materially decrease the normal production of most wells drilled by the rotary method.

Therefore, an important object of this invention is to provide simple means whereby the entrance of the mud fluid or slush into a producing stratum may be limited, localized or prevented so that the return of the mud fluid or slush to the drilled hole is expedited and made more certain.

In carrying out the invention a sealing medium embodying both granular and flaky substances may be mixed with the mud or slush and conveyed thereby to the producing stratum to close off the pores and interstices therein.

That portion of the sealing medium which consists of flakes such as fish scales, celluloid flakes or mica flakes is intended to coat the wall of the drilled hole and thereby close the interstices or pores at that point. The initial movement of the mud slush into the pores or interstices of the producing stratum will cause the flakes or scales to lodge against the wall of the well in overlapping or superimposed relation and thereby cut off further movement of the mud bearing fluid into the producing stratum. It is possible that the initial movement of the mud bearing fluid into the producing stratum will not result in the complete coating of the wall and in that case the continued flow of mud bearing fluid under pressure into the sands or other producing formation will result in the lodgement of additional flakes in engagement with the portion of the wall which remains open.

With the wall of the well thus coated with the flaky or scaly material the same would appear much like the armor on the skin of a fish and these flakes or scales would be held in place not only by the pressure of the fluid, but by their natural affinity for each other. With the flakes or scales thus lodged against the wall of the well further movement of the mud bearing fluid into the producing stratum is inhibited. However these flakes or scales function somewhat as one way valves and do not in any way resist the movement of the natural fluid from the producing stratum into the drilled hole.

The granular portion of the sealing medium may consist both of fine and coarse particles bearing a proportionate relation to each other and the flaky substance and mixed with the mud fluid supplied to the bottom of the well so that the same will enter some or all of the pores or interstices in the producing strata and close the same against the admission of additional mud fluid. The employment of both blended fine and coarse grains in the granular portion of the sealing medium makes the closing of the pores or interstices in the immediate vicinity of the hole more certain as a fine pore or interstice might seal off better with a small grain than with a large grain. More specifically a large grain might not enter a particular interstice or pore sufficiently to find secure lodgment, whereas a smaller grain might enter sufficiently to close the pore or interstice especially when engaged with one of the numerous strictures therein.

The presence of strictures at frequent intervals in the pores or interstices in the producing stratum prevents the movement of the grains of the sealing medium beyond the immediate vicinity of the hole. When the grains of the sealing medium lodge either within or at the entrances to the interstices in the sands the same act as barriers or one way valves by which the movement of the mud bearing fluid is confined to the immediate vicinity of the drilled hole.

By thus employing a sealing medium consisting of both flaky and granular substances the penetration of the mud into the producing stratum is limited so that the oil and gas therein may be relied on to return the sealing medium and the mud in the sands to the hole from where it may be easily bailed to the surface. Once a grain is thrust into sealing off engagement in or against a pore or passage in the producing stratum the weight or pressure of the mud fluid holds the same in place during the remainder of the drilling operation, and until such pressure is removed by bailing.

Various substances may be employed for the sealing medium and it has been found that saw dust, fish scales, cotton seed hulls, flax seed, mica flakes, wheat bran, celuloid flakes, rubber pulp ground fine, cut shavings, shredded sugar cane pulp, gutta percha flakes, hashed or chopped hemp or other similar substances are admirably adapted for the efficient closing of the pores as previously pointed out.

To those skilled in the art it will be obvious that the sealing medium need not be employed during the entire drilling operation, but only when a producing stratum is approached and while drilling therethrough. It is also obvious that since it is necessary to use the sealing medium for only a comparatively short period the cost of the same is negligible and that no departure from prevailing drilling practices other than that mentioned in this specification is necessary for the successful practice of this invention.

In summarizing it will be seen that the flaky and the granular substances act separately and jointly in setting up a barrier against the extensive penetration of the mud bearing fluid into the producing stratum. In further alluding to this feature it is pointed out that two separate and yet highly cooperative agents are employed to guard against the extensive movement of the mud bearing fluid into the producing stratum. The first agent consists of the flaky portion adapted to coat the wall of the hole and possibly enter the producing formation. The second agent consists of the granular portion of the sealing medium adapted to enter the producing formation to lodge against the strictures in the pores or interstices therein and to also lodge against the inner ends of the interstices in somewhat the same manner as do the flakes.

No particle of the sealing medium will stop at any opening or interstice in the sands until it encounters a smaller passage than any passage it has come through. Consequently when the hole is bailed slight pressure from the producing sands will force the foreign matter back into the well. Furthermore in oil wells, as the oil replaces the water content of each grain the grains will shrink for the reason that the grains are more susceptible to expansion by water than by oil. In addition to this the oil which replaces the water in the grains will act as a lubricant to facilitate the return of the grains to the well.

The invention may be carried out very successfully by the employment of different granular and flaked materials in the sealing medium. For example, any two or more of the previously mentioned substances may be combined to produce a sealing medium having the properties desirable for use in a particular well. It will be seen that the invention not only contemplates the blending of different materials, but also contemplates the blending of large and small grains or flakes of the same commodity. The invention is also capable of expression by the employment of different sizes of grains or flakes of different materials.

Having thus described the invention, what is claimed is:

In well drilling operations, the method of protecting producing strata from the undue incursion of mud circulation, which comprises, introducing mud circulation into the well-hole, introducing mica flakes into the mud circulation when a zone of a producing stratum is reached, coating the wall of the well-hole in the zone of the producing stratum with said flaky material through the medium of the mud circulation, and, maintaining said coating in position on said wall at said zone, by the superior pressure of the mud circulation over the pressure of the fluid in the producing stratum.

In testimony whereof I affix my signature.
ALEXANDER BOYNTON.